US005820713A

United States Patent [19]
Iddon

[11] Patent Number: 5,820,713
[45] Date of Patent: Oct. 13, 1998

[54] SEALING MACHINE AND METHOD

[75] Inventor: Robert Oliver Iddon, Broxbourne, England

[73] Assignee: Printed Forms Equipment Limited, Essex, England

[21] Appl. No.: 464,754

[22] PCT Filed: Dec. 21, 1993

[86] PCT No.: PCT/GB93/02612

§ 371 Date: Aug. 14, 1995

§ 102(e) Date: Aug. 14, 1995

[87] PCT Pub. No.: WO94/14624

PCT Pub. Date: Jul. 7, 1994

[30] Foreign Application Priority Data

Dec. 21, 1992 [GB] United Kingdom .................... 9226616

[51] Int. Cl.[6] ...................................................... B32B 31/00

[52] U.S. Cl. ............................ 156/64; 156/352; 156/360; 156/362; 156/442.2; 156/442.3; 271/263; 271/265.04

[58] Field of Search ..................................... 156/352, 360, 156/362, 363, 364, 441.5, 442.1, 442.2, 442.3, 64; 271/262, 263, 265.04

[56] References Cited

U.S. PATENT DOCUMENTS

| | | | |
|---|---|---|---|
| 3,937,453 | 2/1976 | Hickey et al. | 271/4 |
| 4,462,587 | 7/1984 | Graef et al. | 271/263 |
| 4,707,598 | 11/1987 | Croset et al. | 271/262 X |
| 5,067,704 | 11/1991 | Tsuihiji et al. | 271/262 |
| 5,139,597 | 8/1992 | Walter et al. | 156/226 |
| 5,265,731 | 11/1993 | Van De Ven | 209/552 |
| 5,303,912 | 4/1994 | Blank et al. | 271/263 |

FOREIGN PATENT DOCUMENTS

| | | | |
|---|---|---|---|
| 392867 | 10/1990 | European Pat. Off. . | |
| 482824 | 4/1992 | European Pat. Off. . | |
| 537978 | 4/1993 | European Pat. Off. . | |
| 596606 A1 | 5/1994 | European Pat. Off. | 271/262 |
| 2513607 | 4/1983 | France . | |

*Primary Examiner*—David A. Simmons
*Assistant Examiner*—Paul M. Rivard
*Attorney, Agent, or Firm*—Young & Thompson

[57] ABSTRACT

A sealing machine and method are described as used for sealing the edges of documents so that envelopes are not needed. In known such machines, particularly when used for sealing the documents by pressure, problems arise if documents overlap either partially or fully (i.e. a double document) because the pressure rollers in the machine easily jam. The documents being sealed may be very valuable (e.g. pay slips) and any loss or damage is a serious problem. The invention therefore provides means for sensing the presence of double or overlapping documents in a feed path of the machine and means for diverting such double or overlapping documents upstream of the sealing means. Both the thickness and the length of the documents are measured and compared to preset values, such as may be stored in a microprocessor either from ideal figures or from measurements taken during a controlled start-up procedure.

9 Claims, 1 Drawing Sheet

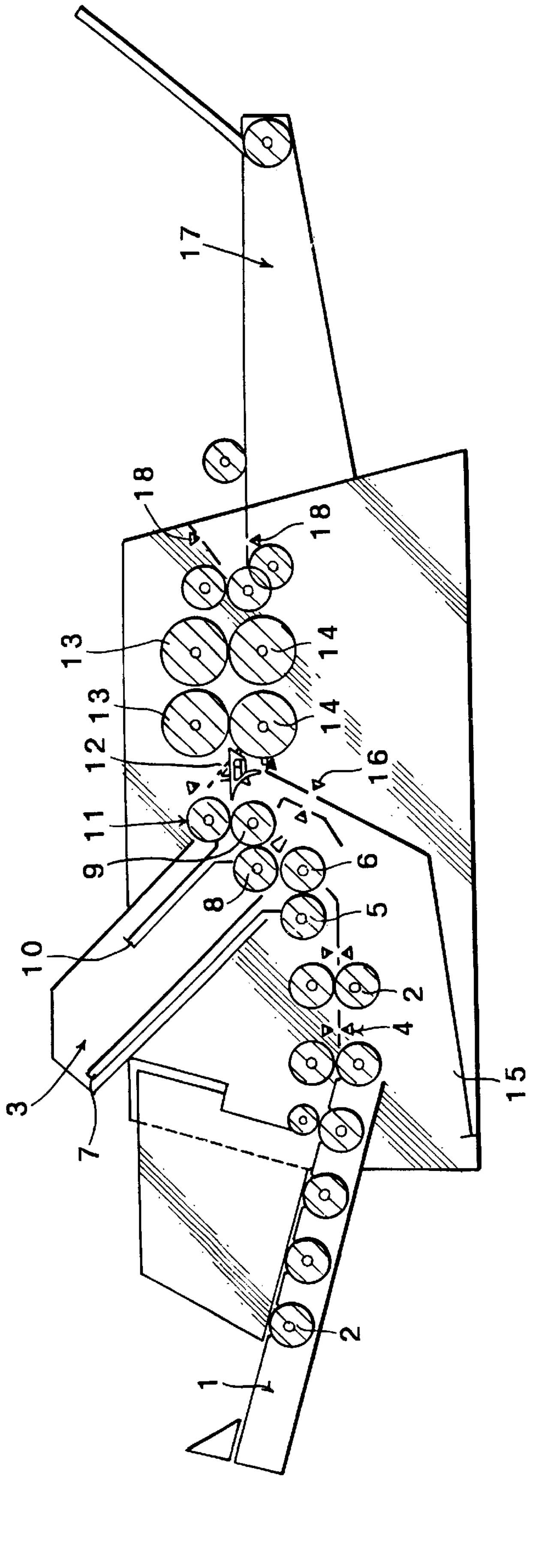
1
2
2
3
4
5
6
7
8
9
10
11
12
13
13
14
14
15
16
17
18
18

SEALING MACHINE AND METHOD

FIELD OF THE INVENTION

The present invention relates to a sealing machine such as is conventionally used for mailing documents without envelopes by sealing the edges of the documents. It is particularly applicable to pressure sealing machines.

A method is also provided.

BACKGROUND ART

In a conventional pressure sealing machine a document to be sealed is fed from a storage hopper and guided by rollers to a folding box for folding the document along predetermined fold lines and then fed through high pressure rollers to activate bands of pressure sensitive glue to seal the form or document into the folded position for distribution. Such forms are used for a variety of purposes such as pay-slips, library reminders and subscriptions amongst many.

A problem arises however if more than one document at a time is fed through the pressure seal rollers. The pressure applied by these rollers is very great, up to two tons and hence they are easily jammed if for example two documents have been fed simultaneously through the system or if documents have been allowed to overlap. This problem is known in other paper processing machines such as machines which fold documents to put them in envelopes and sensors have been used in those machines to sound an alarm. However, in a pressure sealing machine, due to the large pressures applied between the pressure rollers, a double document is more difficult to remove. In addition, the documents processed by such pressure sealing machines are often valuable documents (e.g. payslips) and their loss or damage in the machine needs to be carefully monitored.

SUMMARY OF THE INVENTION

According to one aspect of the present invention, there is provided a document sealing machine comprising a feed path supplying documents to a sealing arrangement, and sensing means arranged to monitor documents in the feed path to detect a faulty document and wherein preventing means responsive to the sensing means are provided to prevent such a faulty document from being sealed.

According to one embodiment of the present invention, there is provided a document sealing machine comprising means for sensing the presence of double or overlapping documents in a feed path of the machine and means, upstream of the sealing means, for diverting the double or overlapping documents in response to the sensing means.

According to the present invention, there is also provided a method of sealing documents comprising means for detecting a fault in the feed path and means for diverting documents in response to the fault, before the document is sealed.

The sensing means may be a series of infra-red detectors measuring the thickness of a document in the feed path. A double document may be detected by calculating the average thickness of a document and overlapping documents may be detected by measuring the length of a document.

If a document is detected which would potentially jam the machine (as determined by pre-programmed parameters), then diverting means such as a vane may be activated to divert the double or overlapping documents into a tray for manual inspection.

These documents may either be put back in the feed tray at the beginning of the feed path, or alternatively a hand in-feed position may be provided in the machine between the folding box and the pressure rollers so that an operator can fold the diverted documents by hand and manually feed them into the machine for sealing. This hand-feed position is also useful for sealing test forms or damaged forms or for resealing forms which have been inadequately sealed in the first pass through the machine.

The sensors could alternatively or in addition, operate an alarm or stop the machine. Any one or any combination of these methods could be used.

According to a second aspect of the present invention there is provided a pressure sealing machine with a diversion means provided upstream of the pressure rollers. Such a diversion means provides a setup facility. Different lengths and thicknesses of documents require different setup conditions and often documents will be run through the machine during a setup period to determine the appropriate conditions. Diverting the forms before the pressure rollers allows the machine to be setup without damaging the forms. This setup can be carried out from a control panel.

It will be readily seen that many aspects of the invention could be used with other sealing machines such as wet glue sealing machines.

BRIEF DESCRIPTION OF DRAWING

The invention is further described below, by way of example, with reference to the accompanying FIGURE which is a sectional side view of a pressure sealing machine according to the invention.

DETAILED DESCRIPTION OF DRAWING

The sealing machine illustrated in the FIGURE comprises a document feed area including feed table 1, a folding area including foldbox 3 and a sealing area comprising high pressure rollers 13 and 14.

Forms which are to be sealed are fed, either automatically or manually, onto feed table 1 and then through automatic rollers 2 towards the foldbox 3. Interspersed along the route between the feed table 1 and the foldbox 3 are a plurality of electronic sensors 4, which may be for example infra-red beam sensors.

Each form is fed by rollers 5 and 6 into foldbox 3 until the leading edge of the form reaches an adjustable backstop 7. The backstop 7 is arranged to stop the form before the trailing edge of the form has passed through rollers 5 and 6. Rollers 5 and 6 continue to feed the form and the form is forced to buckle at a fold line determined by the relative positions of the backstop 7 and the rollers 5 and 6. The form buckles in a generally L-shaped configuration and the outer edge of the foldline is displaced towards roller 8 and consequently fed between rollers 6 and 8 and on between rollers 8 and 9 into a second folding channel of the foldbox 3. The leading edge of the partly folded form is now the outer edge of the foldline and this is driven up the second channel until it contacts a second adjustable backstop 10. The form is again forced to buckle at a second predetermined foldline. The outer edge of this second foldline is forced between rollers 9 and 11 and the form, thus twice folded, passes over a vane 12 and is now ready for sealing. The edges of the form are pre-coated with pressure sensitive glue and as it is fed between pressure rollers 13 and 14, it is sealed, ready for mailing, by the application of pressure from these rollers 13 and 14 which activates the pressure sensitive glue.

The electronic sensors 4 detect any abnormalities in the flow of forms by monitoring the length of the forms to detect two forms slightly overlapping each other and/or monitoring the average thickness of the forms, to detect double or triple documents. If either abnormality is detected an electronic signal is sent to vane 12 causing it to rotate, thus preventing the folded form, as it exits from the foldbox 3 through rollers 9 and 11, from entering between the pressure rollers 13 and 14. Such a rejected form is diverted into a reject collection tray 15. In this way, rogue "double documents" are not only detected but are also automatically prevented from entering between the pressure rollers and thus jamming the machine. Electronic sensors 16 detect rejected forms passing and may be used to alert an operator to the presence of rejected forms in tray 15.

The machine is preferably arranged to allow documents to be manually fed into the pressure roller section of the apparatus so that rejected forms can be individually sealed by hand or so that inadequately sealed or damaged forms can be re-sealed by hand or as a set-up facility for sealing test forms. This is not specifically shown in the FIGURE.

Forms which have been successfully folded and sealed exit pressure rollers 13 and 14 onto exit table 17 from which they can be manually collected for distribution or from where they can be fed to stacking, sorting or franking machinery. Detectors 18, which may again be infra-red, monitor the exit of finished forms from the machine and can be used for check counting, i.e. to ensure that all forms entering the machine have come out or to detect double or overlapping documents or incorrectly folded or sealed forms.

In a modification of the device described above and shown in the FIGURE, the sensors 4 may be used to initiate a number of responses to the presence of a "double document", for example an alarm may be sounded to alert an operator, the machine drive may be stopped.

It will be seen that the invention may be carried out in a number of ways. The machine shown in the FIGURE is described by way of example.

I claim:

1. A method of calibrating a document sealing machine having:

at least one pressure sealer;

a feed path for supplying documents to be sealed to the at least one pressure sealer;

sensing means to monitor documents in the feed path to detect the presence of overlapping documents in the feed path, the sensing means comprising means for providing a first thickness signal representing a thickness of a document in the feed path at predetermined time intervals and means for comparing a value of the first thickness signal with a second thickness signal value;

calibration means comprising means for manually feeding a single document into the feed path and means for providing the second thickness signal representing the thickness of the manually fed single document; and preventing means responsive to the sensing means for preventing overlapping documents from reaching said pressure sealer, said method comprising the step of:

manually feeding the single document into the feed path during a set-up procedure.

2. A document sealing machine comprising:

at least one pressure sealer;

a feed path for supplying documents to be sealed to the at least one pressure sealer;

sensing means to monitor documents in the feed path to detect a presence of overlapping documents in the feed path, the sensing means comprising means for providing a first thickness signal representing a thickness of a document in the feed path at time intervals and means for comparing a value of the first thickness signal with a second thickness signal value;

calibration means comprising means for manually feeding a single document into the feed path and means for providing the second thickness signal representing a thickness of the manually fed single document; and preventing means responsive to the sensing means, for preventing overlapping documents from reaching said pressure sealer.

3. A document sealing machine according to claim 2, wherein the preventing means diverts the overlapping documents upstream of the at least one pressure sealer in the feed path.

4. A document sealing machine according to claim 2, wherein the preventing means stops the machine before the overlapping documents reach the at least one pressure sealer.

5. A document sealing machine according to claim 2, further comprising an alarm operable in response to the sensing means sensing overlapping documents.

6. A document sealing machine according to claim 2, wherein the sensing means comprises monitoring means to monitor a presence of a document continually for determining its length.

7. A document sealing machine according to claim 6, wherein the monitoring means detects leading the trailing edges of a document and to measure a time interval between a leading edge and a next subsequent trailing edge as an indication of its length so as to detect overlapping documents by comparing a measured length with a preset length value.

8. A document sealing machine according to claim 7, wherein the calibration means comprises means for measuring the length of the manually fed single document to determine the preset length value.

9. A document sealing machine according to claim 2 further comprising a microprocessor, in which preset values of particular parameters can be stored, and to which measurement signals are supplied from the sensing means, and which effects calculations to determine the presence of double or overlapping documents.

* * * * *